(12) United States Patent
Yoshimoto et al.

(10) Patent No.: US 7,116,890 B2
(45) Date of Patent: Oct. 3, 2006

(54) IMAGE RECORDING AND REPRODUCING APPARATUS AND IMAGE RECORDING AND REPRODUCING METHOD

(75) Inventors: Masakazu Yoshimoto, Kanagawa (JP); Satoshi Yoneya, Kanagawa (JP)

(73) Assignee: Sony Corporation, Tokyo (JP)

( * ) Notice: Subject to any disclaimer, the term of this patent is extended or adjusted under 35 U.S.C. 154(b) by 1277 days.

(21) Appl. No.: 09/891,061

(22) Filed: Jun. 25, 2001

(65) Prior Publication Data

US 2001/0055470 A1  Dec. 27, 2001

(30) Foreign Application Priority Data

Jun. 27, 2000  (JP)  ............................. 2000-193017

(51) Int. Cl.
 H04N 5/91 (2006.01)
 H04N 7/64 (2006.01)

(52) U.S. Cl. ........................................ 386/68; 386/116
(58) Field of Classification Search ................ 386/116, 386/113, 114, 68, 46, 125, 126, 124, 65, 1, 386/21, 76

See application file for complete search history.

(56) References Cited

U.S. PATENT DOCUMENTS 6,728,470 B1 *  4/2004  Ito et al. ........................ 386/68
6,798,972 B1 *  9/2004  Ito et al. ........................ 386/68

* cited by examiner

Primary Examiner—Robert Chevalier
(74) Attorney, Agent, or Firm—Frommer Lawrence & Haug LLP; William S. Frommer; Thomas F. Presson

(57) ABSTRACT

An image recording and reproducing apparatus and an image recording and reproducing method in which, in an AV server using a so-called G-Shuttle system, the processing required in the high-speed playback mode can be simplified. A corresponding relationship between image groups results from dividing image data of each image unit by a plurality of image groups and groups of a first memory are being cyclically changed at every image unit, the image groups are recorded by the first memory and error-correcting codes of the image groups are generated at every image unit and recorded by a second memory. During normal speed playback, the image groups and the error-correcting codes are reproduced and digital errors of the image groups are corrected. During high-speed playback, the error-correcting codes are not reproduced.

14 Claims, 10 Drawing Sheets

FIG. 1 (RELATED ART)

| Frame No. | Group W | Group X | Group Y | Group Z |
|---|---|---|---|---|
| 1 | A | B | C | D |
| 2 | B | C | D | A |
| 3 | C | D | A | B |
| 4 | D | A | B | C |
| 5 | A | B | C | D |
| 6 | B | C | D | A |
| 7 | C | D | A | B |
| 8 | D | A | B | C |
| 9 | A | B | C | D |
| 10 | B | C | D | A |
| 11 | C | D | A | B |
| 12 | D | A | B | C |
| 13 | A | B | C | D |
| 14 | B | C | D | A |
| 15 | C | D | A | B |
| 16 | D | A | B | C |

FIG. 7

| Frame No. | Group W | Group X | Group y | Group Z | HDD22 |
|---|---|---|---|---|---|
| 1 | A1 | B1 | C1 | D1 | Parity Bit |
| 2 | B2 | C2 | D2 | A2 | Parity Bit |
| 3 | C3 | D3 | A3 | B3 | Parity Bit |
| 4 | D4 | A4 | B4 | C4 | Parity Bit |
| 5 | A5 | B5 | C5 | D5 | Parity Bit |
| 6 | B6 | C6 | D6 | A6 | Parity Bit |
| 7 | C7 | D7 | A7 | B7 | Parity Bit |
| 8 | D8 | A8 | B8 | C8 | Parity Bit |
| 9 | A9 | B9 | C9 | D9 | Parity Bit |
| 10 | B10 | C10 | D10 | A10 | Parity Bit |
| 11 | C11 | D11 | A11 | B11 | Parity Bit |
| 12 | D12 | A12 | B12 | C12 | Parity Bit |
| 13 | A13 | B13 | C13 | D13 | Parity Bit |
| 14 | B14 | C14 | D14 | A14 | Parity Bit |
| 15 | C15 | D15 | A15 | B15 | Parity Bit |
| 16 | D16 | A16 | B16 | C16 | Parity Bit |

FIG. 8

| Framre No. | Group W | Group X | Group Y | Group Z | HDD22 |
|---|---|---|---|---|---|
| 1 | A1 | | | | |
| 2 | B2 | | | | |
| 3 | C3 | | | | |
| 4 | D4 | | | | |
| 5 | A5 | | | | |
| 6 | B6 | | | | |
| 7 | C7 | | | | |
| 8 | D8 | | | | |
| 9 | A9 | | | | |
| 10 | B10 | | | | |
| 11 | C11 | | | | |
| 12 | D12 | | | | |
| 13 | A13 | | | | |
| 14 | B14 | | | | |
| 15 | C15 | | | | |
| 16 | D16 | | | | |
| 17 | | B17 | | | |
| 18 | | C18 | | | |
| 19 | | D19 | | | |
| 20 | | A20 | | | |
| 21 | | B21 | | | |
| 22 | | C22 | | | |
| 23 | | D23 | | | |
| 24 | | A24 | | | |
| 25 | | B25 | | | |
| 26 | | C26 | | | |
| 27 | | D27 | | | |
| 28 | | A28 | | | |
| 29 | | B29 | | | |
| 30 | | C30 | | | |
| 31 | | D31 | | | |
| 32 | | A32 | | | |

FIG. 9

| Frame No. | Group W | Group X | Group Y | Group Z | HDD22 |
|---|---|---|---|---|---|
| 33 | | | C33 | | |
| 34 | | | D34 | | |
| 35 | | | A35 | | |
| 36 | | | B36 | | |
| 37 | | | C37 | | |
| 38 | | | D38 | | |
| 39 | | | A39 | | |
| 40 | | | B40 | | |
| 41 | | | C41 | | |
| 42 | | | D42 | | |
| 43 | | | A43 | | |
| 44 | | | B44 | | |
| 45 | | | C45 | | |
| 46 | | | D46 | | |
| 47 | | | A47 | | |
| 48 | | | B48 | | |
| 49 | | | | D49 | |
| 50 | | | | A50 | |
| 51 | | | | B51 | |
| 52 | | | | C52 | |
| 53 | | | | D53 | |
| 54 | | | | A54 | |
| 55 | | | | B55 | |
| 56 | | | | C56 | |
| 57 | | | | D57 | |
| 58 | | | | A58 | |
| 59 | | | | B59 | |
| 60 | | | | C60 | |
| 61 | | | | D61 | |
| 62 | | | | A62 | |
| 63 | | | | B63 | |
| 64 | | | | C64 | |

IMAGE RECORDING AND REPRODUCING APPARATUS AND IMAGE RECORDING AND REPRODUCING METHOD

BACKGROUND OF THE INVENTION

1. Field of the Invention

The present invention generally relates to an image recording and reproducing apparatus such as an AV (audio and/or video) server in which image data is recorded/reproduced by memory means which can be accessed randomly, and particularly to an image recording and reproducing apparatus and an image recording and reproducing method in which an image can be prevented from being disturbed due to digital errors caused in the normal tape speed playback mode and in which image data can be prevented from dropping out at the frame unit or the like in the high-speed playback mode.

2. Description of the Related Art

In recent years, recording/editing/transmitting systems in the broadcasting station are required to become able to simultaneously record a plurality of material data (video and/or audio data), to become able to edit material data which is being recorded in real time, and are also required to become able to transmit the same material data through a plurality of channels at the same time. To meet these demands, heretofore, there are used apparatus called an "AV (audio and/or video) server" or a "video server".

An AV server generally includes a plurality of input/output (I/O) ports which can operate independently and a data memory section (e.g., hard disk drive (HDD)) which can be accessed randomly. When different material data are simultaneously inputted from these I/O ports to the AV server and recorded by the data memory section, it becomes possible to record a plurality of material data at the same time. When material data, which is being inputted from one I/O port and is being recorded, is simultaneously and parallelly reproduced from the data memory section and outputted from other I/O port, it becomes possible to edit the material data, which is being recorded, in real time in a nonlinear editing fashion. Furthermore, it becomes possible to simultaneously transmit the same material data through a plurality of channels by outputting the same material data reproduced from the data memory section from a plurality of I/O ports.

In the case of the nonlinear editing, in order to search an edit point whose time code is not clear, image data have to be reproduced at high speed (speed higher than a one-time normal speed) and the image data thus reproduced have to be displayed on a monitor, whereby a scene which serves an edit point can be detected In the conventional AV server, when the edit point is searched at high speed, it is customary that image data are reproduced at random in the unit of frames. Specifically, when image data is reproduced in the twice normal speed playback mode, image data are reproduced on every other frame such as the first frame, the third frame, the fifth frame, . . . When image data is reproduced in the four-times normal speed playback mode, image data are reproduced on every three frames such as the first frame, the fifth frame, the ninth frame, . . .

However, when image data is reproduced at random in the unit of frames, image data of the skipped frame is lost completely. Accordingly, when it is intended to search a momentary scene in which a flash bulb is lit as an edit point, image data of the frame corresponding to such momentary scene is lost completely. As a result, it is frequently observed that such momentary scene cannot be detected.

To solve the above problem, the assignee of the present application has already proposed a system (so-called "G-shuttle system") in which image data of individual frames can be prevented from dropping out completely in the high-speed playback mode (see Japanese patent application 11-317926).

FIG. 1 shows the manner in which image data are recorded by this G-shuttle system. Upon recording, inputted image data is divided in the unit of one frame to provide four image groups A, B, C and D, for example. Hard disk drives (HDDs), which are grouped as four groups W, X, Y and Z in response to the number of the image groups A, B, C and D, are adapted to record the image groups while a corresponding relationship between the image groups A, B, C, D and the groups W, X, Y, Z of the HDDs is being changed cyclically at every frame.

In the four-times normal speed playback mode of the high-speed playback modes, for example, ID (identification data) and image groups of the first 16 frames (frames No. 1 to No. 16 in FIG. 1) are reproduced from the group W, ID and image groups of the next 16 frames are reproduced from the group X, ID and image groups of the next 16 frames are reproduced from the group Y, and ID and image groups of the next 16 frames are further reproduced from the group Z of the HDDs 21 shown in FIG. 6 which will be described later on.

Then, image data of one frame is sequentially synthesized from image data (image groups A, B, C and D) of four consecutive frames in such a manner as to synthesize image data of first one frame from the image data (image groups A, B, C and D) of the frames Nos. 1, 2, 3 and 4 reproduced from the group W and to synthesize image data of the next one frame from the image data (image groups A, B, C and D) of the frames Nos. 5, 6, 7 and 8 reproduced from the group W . . .

With respect to image data of frames following 65th frame, the same processing is repeated for 64 frames.

As a result, there can be obtained image data containing one portion (one image group each) of each of image data of all recorded frames with the result that image data of individual frames can be prevented from completely dropping out. Accordingly, when the edit point is searched at high speed, if it is intended to search a momentary scene in which a flash bulb is lit as an edit point, then a part of image data of the frame corresponding to that momentary scene is displayed on the monitor, thereby making it possible for users to detect such momentary scene.

Also in the twice-normal speed playback mode and the eight-times normal speed playback mode, image groups are reproduced from the groups W, X, Y, Z over the range of the frames which are not identical to each other and image data of one frame is synthesized from the reproduced image groups A, B, C and D of the frames which are not identical to each other, whereby image data of individual frames can be prevented from completely dropping out (in the case of the eight-times normal speed playback mode, the number of frames in which image data completely drops out is decreased).

In the high-speed playback mode to search the edit point, even when an image on the monitor is disturbed due to a digital error existing in the image data reproduced from any of the HDD groups W, X, Y, Z, such disturbance of image, in particular, may not cause a serious problem.

On the other hand, upon broadcasting in which the recorded material data is reproduced in the normal speed mode (reproduced at one-time normal speed) and reproduced data is transmitted, an image displayed on a television receiver can be prevented from being disturbed due to this digital error.

However, there has not yet been disclosed an AV server in which the processing required in the high-speed playback mode can be simplified and in which an image can be prevented from being disturbed due to a digital error in the normal playback mode while the so-called G-Shuttle system is being used.

SUMMARY OF THE INVENTION

In view of the aforesaid aspect, it is an object of the present invention to provide an image recording and reproducing apparatus such as an AV server in which image data can be recorded and reproduced by a memory means that can be accessed randomly and in which the processing required in the high-speed playback mode can be simplified and an image can be prevented from being disturbed due to a digital error caused in the normal playback mode while the so-called G-Shuttle system is being used.

It is another object of the present invention to provide an image recording and reproducing method in which the processing required in the high-speed playback mode can be simplified and an image can be prevented from being disturbed due to a digital error caused in the normal playback mode while the so-called G-Shuttle system is being used.

According to an aspect of the present invention, there is provided an image recording and reproducing apparatus which is comprised of dividing means for dividing inputted image data into a plurality of image groups at every predetermined image unit, first memory means grouped into groups of memory means in response to the number of image groups and which can be accessed randomly, second memory means, generating means for generating an error-correcting code, correcting means for correcting a digital error by the error-correcting code, recording control means for controlling the first memory means such that the first memory means records image groups while cyclically changing a corresponding relationship between the image groups and the groups of the first memory means at every image unit, controlling the generating means such that the generating means generates the error-correcting codes of the image groups at every image unit and controlling the second memory means such that the second memory means records the error-correcting codes, reproducing control means for controlling the groups of the first memory means and the second memory means such that the image groups and the error-correcting codes are reproduced from the groups of the first memory means and the second memory means over the range of the unit of the same image and controlling the correcting means such that the error-correcting means corrects digital errors of the image groups by the error-correcting codes in the one-time normal speed playback mode and controlling the groups of the first memory means such that image groups are reproduced from the groups of the first memory means over the range of the unit of the images which are not identical to each other in the playback mode at speed higher than one-time normal speed and synthesizing means for synthesizing image data of one image unit from the image groups of the same image unit reproduced and error-corrected by the reproducing control means in the one-time normal speed playback mode and synthesizing image data of one image unit from the image groups of the units of images which are not identical to each other reproduced by the reproducing control means in the playback mode at speed higher than one-time normal speed.

In this image recording and reproducing apparatus, upon recording, the dividing means divides inputted image data into a plurality of image groups at every predetermined image unit (e.g., at every frame) Then, under control of the recording control means, the image groups are recorded by the first memory means while a corresponding relationship between the image groups and the groups of the first memory means grouped in response to the number of the image groups is being changed cyclically at every image unit. Further, under control of the recording control means, the error-correcting codes of the image groups are generated at every image unit and recorded by the second memory means.

When the image data thus recorded is reproduced in the normal speed playback mode (one-time normal speed playback mode), under control of the reproducing control means, the image groups and the error-correcting codes are reproduced over the unit of the identical images from the first memory means and the second memory means, and the digital errors of the image groups are corrected by the error-correcting codes. Then, the image data of one image unit is synthesized from the image groups of the identical image unit. Thus, an image can be prevented from being disturbed due to digital errors.

On the other hand, when image data is reproduced in the high-speed playback mode (playback mode at speed higher than one-time normal speed), under control of the reproducing control means, the image groups are reproduced from the groups of the first memory means over the range of the unit of images which are not identical to each other. Then, the image data of one image unit is synthesized from the image groups of the unit of images which are not identical to each other by the synthesizing means. Consequently, image data of individual image units can be prevented from completely dropping out. Further, in the high-speed playback mode, since digital errors of the image data are not corrected (the error-correcting codes for correcting the digital errors of the image data synthesized in the high-speed playback mode are not generated as the assumption), the processing required in the high-speed playback mode can be simplified.

As described above, while the so-called G-Shuttle system is being used, the processing required in the high-speed playback mode can be simplified and the image can be prevented from being disturbed due to digital errors in the normal playback mode.

In accordance with another aspect of the present invention, there is provided an image recording and reproducing method which is comprised of the steps of a first step of dividing inputted image data into a plurality of image groups at every predetermined image unit, a second step in which image groups are recorded by first memory means grouped in response to the number of image groups and which can be accessed randomly while a corresponding relationship between the image groups and the groups of the first memory means is being changed cyclically at every image unit, a third step in which error-correcting codes of the image groups are generated at every image unit and recorded by second memory means, a fourth step in which the image groups and the error-correcting codes are reproduced from the groups of the first memory means and the second memory means over the range of the unit of the identical images and the image groups are error-corrected by the error-correcting codes in the one-time normal speed playback mode and in which the image groups are reproduced from the groups of the first memory means over the range of the unit of images which are not identical to each other in the playback mode at speed higher than the one-time normal speed and a fifth step in which the image data of one image unit is synthesized from the image groups of the unit of the identical images reproduced and error-corrected at the fourth step in the one-time normal speed playback mode and in which the image data of one image unit is synthesized from the image groups of the unit of images which are not identical to each other reproduced at the fourth step in the playback mode at speed higher than the one-time normal speed.

In this image recording and reproducing method, inputted image data is divided into a plurality of image groups at every predetermined image unit. Then, the image groups are recorded by the first memory means while a corresponding relationship between the image groups and the groups of the first memory means grouped in response to the number of the image groups is being cyclically changed at every image unit. Further, the error-correcting codes of the image groups are generated at every image unit and recorded by the second memory means.

When the image data thus recorded is reproduced in the normal speed playback mode, the image groups and the error-correcting codes are reproduced from the first memory means and the second memory means over the range of the unit of a plurality of identical images, and the digital errors of the image groups are corrected by the error-correcting codes. Then, the image data of one image unit is synthesized from the image groups of the unit of the identical reproduced images. As a result, an image can be prevented from being disturbed due to digital errors.

On the other hand, in the high-speed playback mode, the image groups are reproduced from the first memory means over the range of the unit of a plurality of images which are not identical to each other. Then, the image data of one image unit is synthesized from the image groups of the unit of reproduced images which are not identical to each other. As a consequence, image data of individual image units can be prevented from completely dropping out. Further, in the high-speed playback mode, since digital errors are not corrected (the error-correcting codes for correcting digital errors of the image data synthesized in the high-speed playback mode are not generated as the assumption), the processing required in the high-speed playback mode can be simplified.

As described above, while the so-called G-Shuttle system is being used, the processing required in the high-speed playback mode can be simplified and the image can be prevented from being disturbed due to digital errors in the normal playback mode.

BRIEF DESCRIPTION OF THE DRAWINGS

FIG. 1 is a diagram showing the manner in which image data are recorded according to the so-called G-shuttle system;

FIG. 7 is a diagram showing the manner in which image groups and parity bits are recorded on HDDs (hard disk drives) shown in FIG. 6;

FIG. 8 is a diagram showing data which are reproduced from the HDDs shown in FIG. 6 in the four-times normal speed playback mode;

FIG. 9 is a diagram showing data which are reproduced from the HDDs shown in FIG. 6 in the four-times normal speed playback mode.

DESCRIPTION OF THE PREFERRED EMBODIMENT

An embodiment of the present invention which is applied to an AV server will now be described below.

Figure 2:
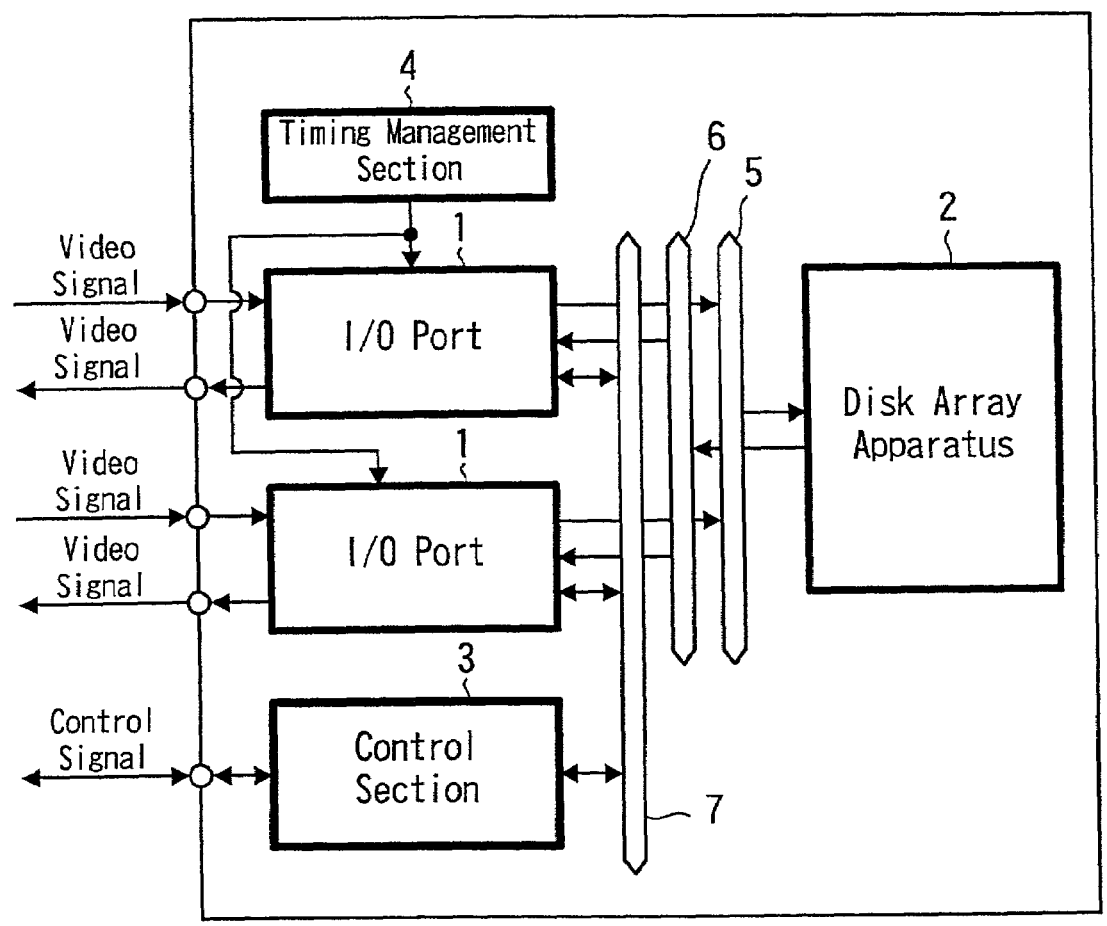
FIG. 2 is a block diagram showing an overall arrangement of an AV server according to the present invention.

FIG. 2 shows in block form an example of an overall arrangement of an AV server according to the present invention. As shown in FIG. 2, the AV server according to the present invention includes a plurality of I/O ports 1 (although two I/O ports are shown, the present invention is not limited thereto and three I/O ports or more may be used in this invention), a disk array apparatus 2, a control section 3 and a timing management section 4.

The respective I/O ports 1 and the disk array apparatus 2 are connected to each other by a down-link bus 5 and an up-link bus 6. The respective I/O ports 1 and the control section 3 are connected to each other by a control bus 7.

The respective I/O ports 1 can operate independently to input and output a video signal of a predetermined standard (e.g., a signal of a synchronizing system such as an SDI or an SDTI or a signal of an asynchronous system such as an ATM or a fiber channel) between them and external devices of the AV server. When this AV server, for example, is used to record, edit and transmit news material data, a video signal transmitted from a television camera or the like in the reporting spot is inputted to the AV server.

When material data is inputted from a certain I/O port 1 and then recorded or when recorded material data is reproduced (a normal reproduction or high-speed reproductions such as a twice normal speed reproduction, a four-times normal speed reproduction or an 8-times normal speed reproduction) and then outputted from a certain I/O port 1, a control signal indicating the contents of such operations is supplied to the control section 3 (the above operations may be executed by an operation control panel attached to the AV server itself or by a host computer, although not shown).

Commands for instructing the input and the recording of material data and commands for instructing the reproduction and the output of recorded material data are supplied from the control section 3 through the control bus 7 to the corresponding I/O port 1.

The timing management section 4 supplies a signal (time slot signal) for repeatedly allowing the down-link bus 5 and the up-link bus 6 to be used sequentially at every constant time to each I/O port 1.

Figure 3:
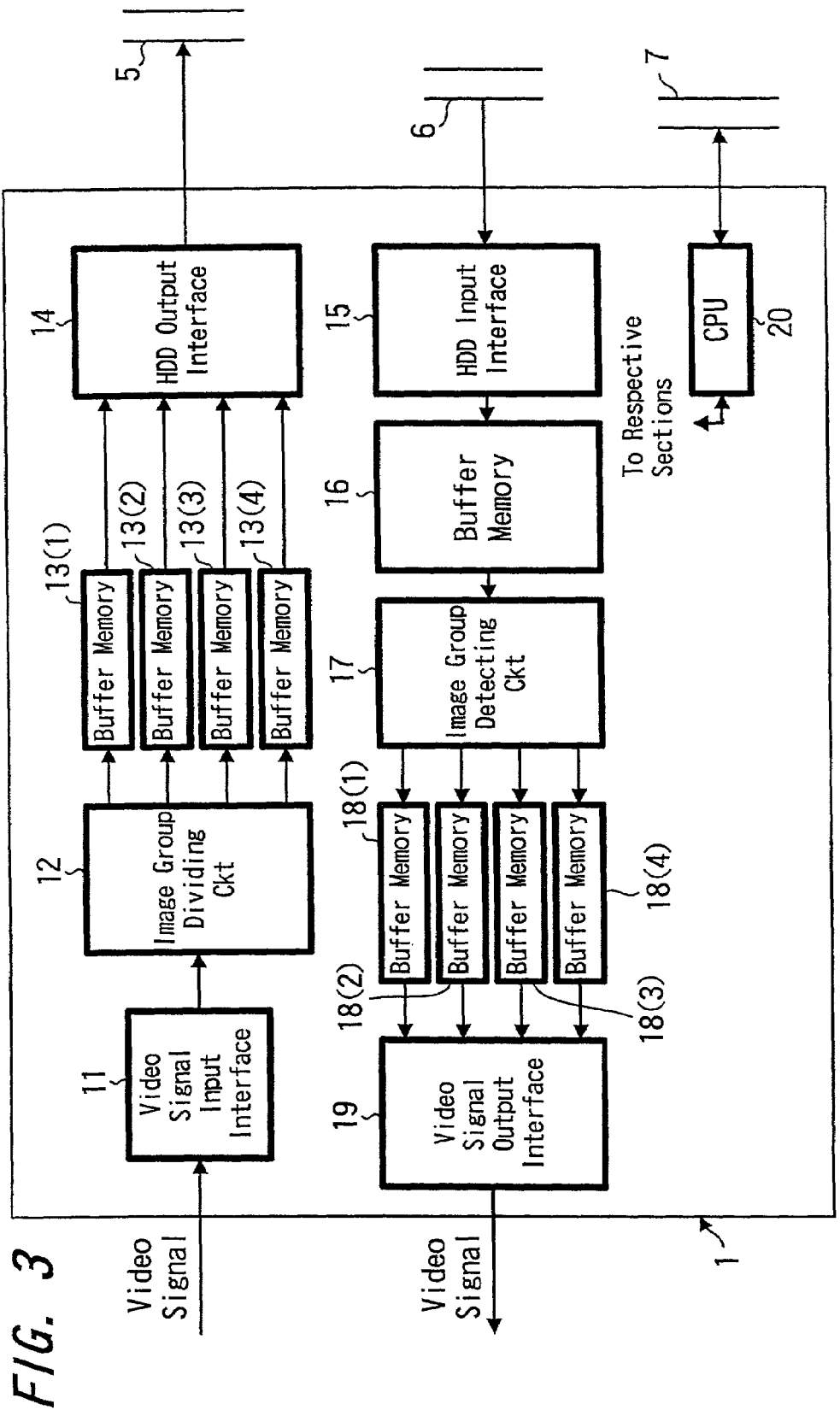
FIG. 3 is a block diagram showing an example of a circuit arrangement of an I/O (input/output) port shown in FIG. 2.

FIG. 3 shows an example of a circuit arrangement of each I/O port 1. As shown in FIG. 3, each I/O port 1 includes a video signal input I/F (interface) 11, an image group dividing circuit 12, buffer memories 13(1) to 13(4) and a HDD (hard disk drive) output I/F (interface) 14, each of which serves as a circuit portion functioning as an input port and an HDD input I/F (interface) 15, a buffer memory 16, an image group detecting circuit 17, buffer memories 18(1) to 18(4) and a video signal output I/F (interface) 19, each of which serves as a circuit portion functioning as an output port and a CPU (central processing unit) 20.

When the command for instructing the input and the recording of material data is supplied from the control section 3 shown in FIG. 2 to the I/O port 1, under control of the CPU 20, the video signal input interface 11 extracts video data and audio data from the inputted video signal (further compresses the extracted image data by a predetermined coding system (e.g., MPEG (moving picture experts group)) according to the need).

Figure 4:
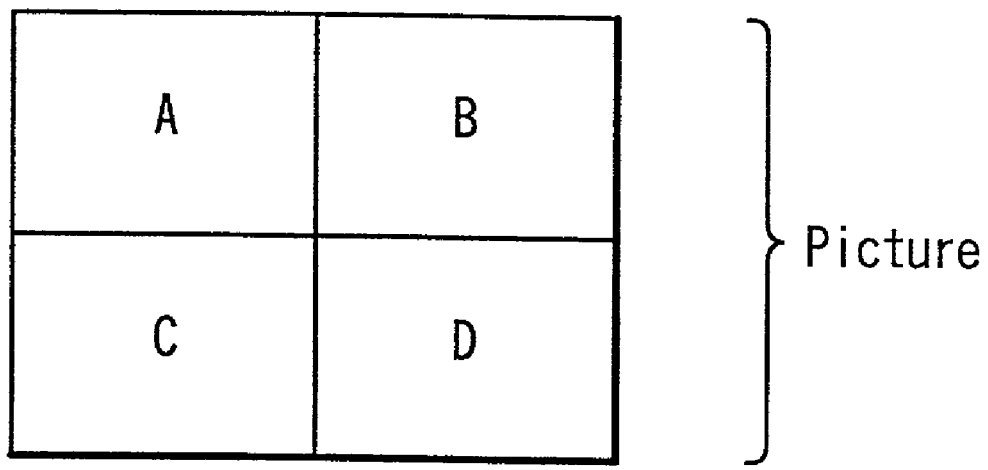
FIG. 4 is a diagram showing examples of divided image data.

The image group dividing circuit 12 distributes and writes image data of each frame extracted by the video signal input interface 11, e.g., an image group A of upper left ¼ of the picture shown in FIG. 4, an image group B of upper right ¼ of the picture, an image group C of lower left ¼ of the picture and an image group D of lower right ¼ of the picture in the respective buffer memories 13(1), 13(2), 13(3) and 13(4), thereby dividing the image data into the image groups A, B, C and D at every frame.

When image data of 16 frames in total are accumulated in the buffer memories 13(1) to 13(4) (i.e., when image data of data amount of 4 frames are accumulated in the buffer memories 13(1), 13(2), 13(3) and 13(4)), the HDD output interface 14 reads out image data of 2 bytes each from the buffer memories 13(1), 13(2), 13(3) and 13(4), in that order (i.e., in the order of the image groups A, B, C and D) with respect to a first frame, a fifth frame, a ninth frame and a thirteenth frame, reads out image data of 2 bytes each from the buffer memories 13(2), 13(3), 13(4) and 13(1) in that order (i.e., in the sequential order of the image groups B, C, D and A) with respect to a second frame, a sixth frame, a tenth frame and a fourteenth frame, reads out image data of 2 bytes each from the buffer memories 13(3), 13(4), 13(1) and 13(2), in that order (i.e., in the sequential order of the image groups C, D, A, B) with respect to a third frame, a seventh frame, an eleventh frame and a fifteenth frame and reads out image data of 2 bytes each from the buffer memories 13(4), 13(1), 13(2) and 13(3), in that order (i e, in the sequential order of the image groups D, A, B, C) with respect to a fourth frame, an eighth frame, a twelfth frame and a sixteenth frame, thereby to read out the image data of 16 frames from the buffer memories 13(1) to 13(4).

The HDD interface 14 adds two ID (identification data) each having one byte length indicative of the image groups A, B, C, D to the head of the image of each frame in accordance with the sequential order of the image groups at the corresponding frames (in the sequential order of the image groups A, B, C, D with respect to a first frame, a fifth frame, a ninth frame and a thirteenth frame, in the sequential order of the image groups B, C, D, A with respect to a second frame, a sixth frame, a tenth frame and a fourteenth frame, in the sequential order of the image groups C, D, A, B with respect to a third frame, a seventh frame, an eleventh frame and a fifteenth frame and in the sequential order of the image groups D, A, B, C with respect to a fourth frame, an eighth frame, a twelfth frame and a sixteenth frame).

Figure 5:
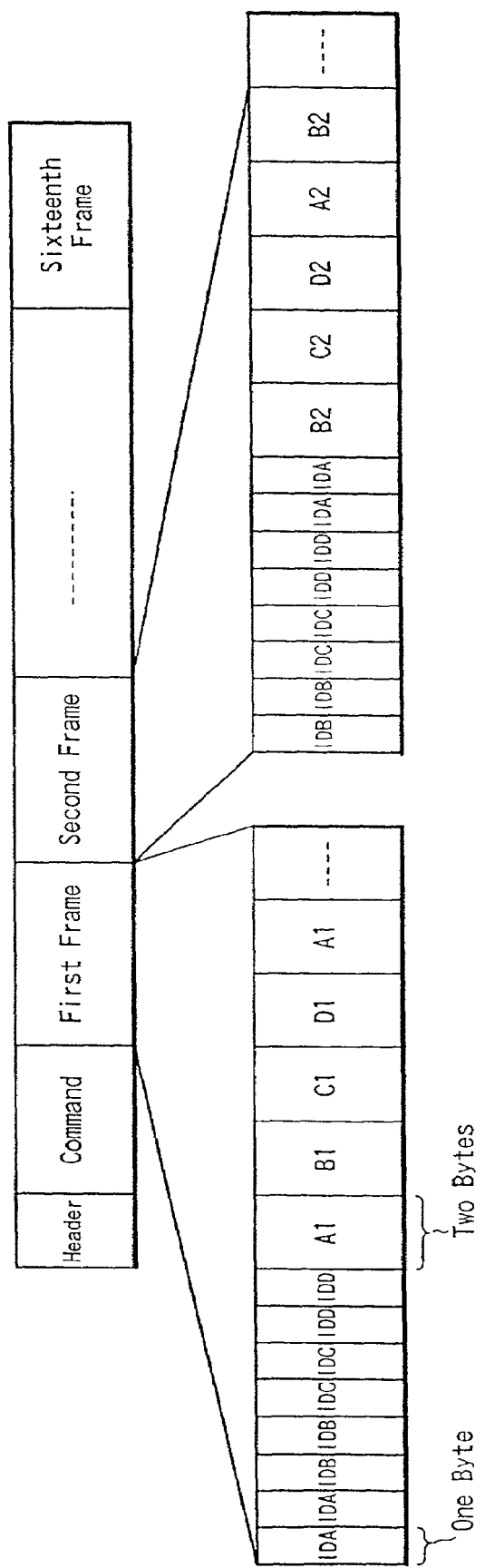
FIG. 5 is a diagram showing a structure of a data stream transferred from the I/O port shown in FIG. 2 to a disk array apparatus.

As a result, there is obtained a data stream having a structure shown in FIG. 5. In FIG. 5 and the following sheets of drawings, IDA, IDB, IDC, IDD represent ID which are indicating the image groups A, B, C, D, and Ai, Bi, Ci, Di represent the image groups A, B, C, D of respective ith (i=1, 2, . . . ) frames.

As shown in FIG. 5, the CPU 20 adds a header indicative of the head of data and a command instructing recording to the head of this data stream. This data stream is transferred from the corresponding I/O port 1 through the down-link bus 5 shown in FIG. 2 to the disk array apparatus 2 within a time period which is allowed to the corresponding I/O port 1 by the time slot signal.

Audio data, extracted by the video signal input interface 11, also is transferred to the disk array apparatus 2 together with this data stream.

Figure 6:
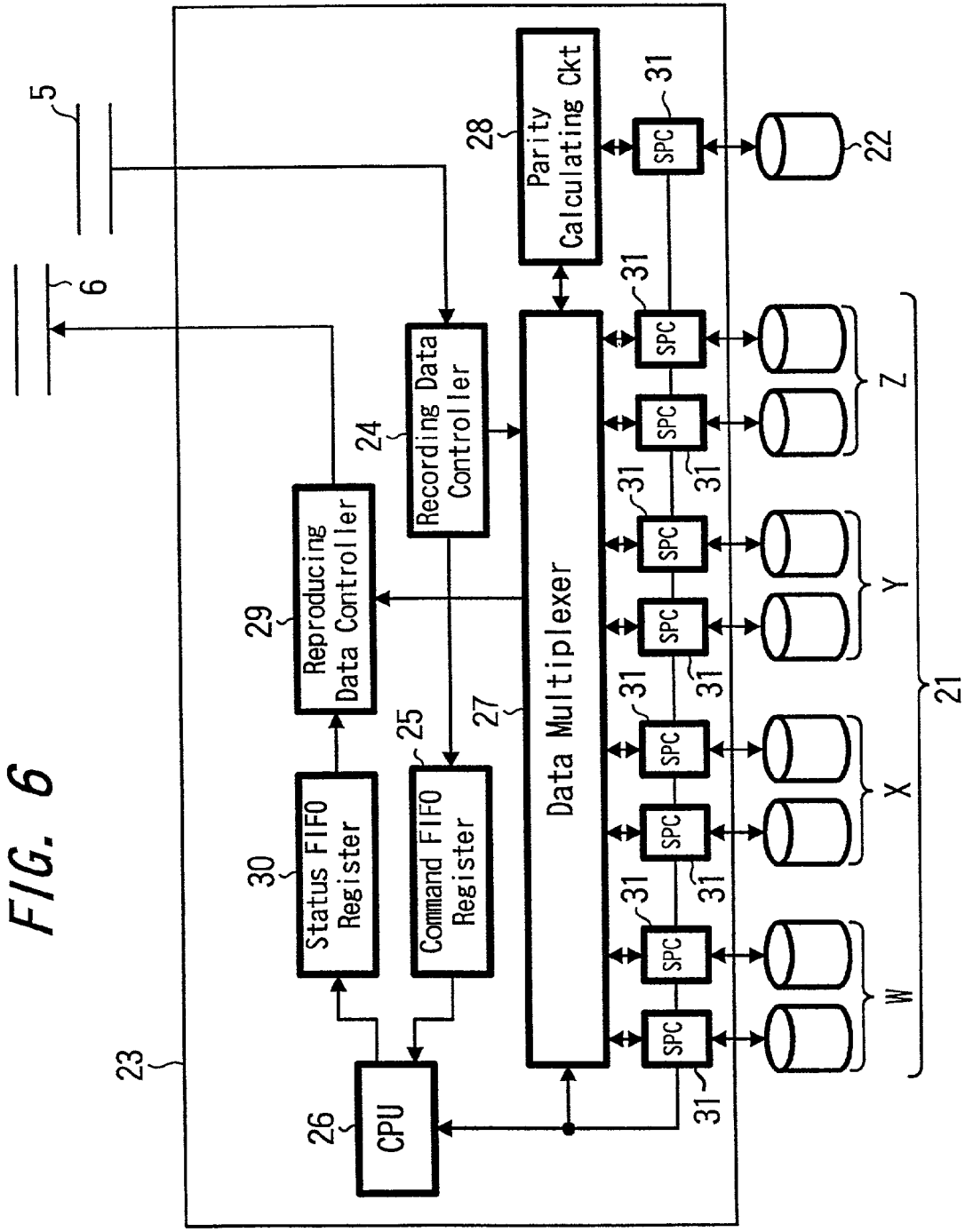
FIG. 6 is a block diagram showing an example of a circuit arrangement of the disk array apparatus shown in FIG, 2.

FIG. 6 shows in block form an example of an arrangement of the disk array apparatus 2. As shown in FIG, 6, the disk array apparatus 2 includes eight HDDs 21 for image data, a HDD 22 for parity data and a disk array controller 23. The disk array controller 23 includes a recording data controller 24, a command FIFO(first-in first-out) register 25, a CPU 26, a data multiplexer 27, a parity calculating circuit 28, a reproducing data controller 29 and a status FIFO 30. The HDDs 21 are divided into four groups W, X, Y and Z, each of which is comprised of two HDDs. The data multiplexer 27 and the HDDs 21, 22 are respectively connected together through SPCs (SCSI (small computer system interface) protocol controllers) 31.

The data stream (FIG. 5) and the audio data transferred from the I/O port 1 to the disk array apparatus 2 are supplied to the recording data controller 24. When detecting the header added to the head of the data stream, the recording data controller 24 writes the command following the header in the command FIFO register 25 and supplies the data stream and the audio data following this command to the data multiplexer 27.

The CPU 26 allows the data multiplexer 27 to repeatedly distribute this data stream to the groups W, X, Y, Z of the HDDs 21 sequentially byte by byte based on the command read out from the command FIFO register 25. The CPU 26 allows also the parity calculating circuit 28 to generate ID of each frame and parity bits of image groups in the data stream supplied to the data multiplexer 27 and also allows the parity calculating circuit 28 to supply the parity bits to the HDD 22 through the SPC 31.

As a consequence, as shown in FIG. 7, while a corresponding relationship between the image groups A, B, C, D and the groups W, X, Y, Z is cyclically being changed at every frame, the image groups A, B, C, D in which the ID are added to their head portions (although ID are not shown) are recorded by the HDDs 21 by 16 frames each and the parity bits of each of these frames are recorded by the HDD 22.

Although not shown in FIG. 6, the disk array apparatus 2 includes a HDD for audio data. The audio data supplied from the recording data controller 24 to the data multiplexer 27 is recorded on this HDD under control of the CPU 26.

Next, when the command for instructing the reproduction and the output of the material data thus recorded is supplied from the control section 3 shown in FIG. 2 to any one of the I/O ports 1, the CPU 20 in the corresponding I/O port 1 judges whether a normal playback is instructed or a high-speed playback is instructed. If the normal playback is instructed, then there is generated a command which instructs the normal playback of the corresponding material data and the error correction. If on the other hand the high-speed playback is instructed, then there is generated a command which instructs only the high-speed playback of the corresponding material data and which does not instruct the error correction.

The command thus generated is transferred through the down-link bus 5 shown in FIG. 2 to the disk array apparatus 2 within a time period permitted to the corresponding I/O port 1 by the time slot signal. The command transferred to the disk array apparatus 2 is written in the command FIFO register 25 through the recording data controller 24 shown in FIG. 6.

If the command read out from the command FIFO register 25 instructs the normal playback and the error correction, then the CPU 26 enables all groups W, X, Y, Z of the HDDs 21 to reproduce ID and image groups of the first 16 frames (frames No. 1 to No. 16 shown in FIG. 7) of the corresponding material data and also enables the HDD 22 to reproduce parity bits of the frames No. 1 to No. 16 of the corresponding material data.

Subsequently, ID and image groups supplied from the HDDs 21 to the data multiplexer 27 are synthesized by the data multiplexer 27 such that there can be obtained the data stream having the same structure as that shown in FIG. 5.

Then, digital errors of the ID and the image groups of each frame in the data stream are corrected by the parity bits with respect to the corresponding frame supplied from the HDD 22 to the parity calculating circuit 28 in the parity calculating circuit 28.

With respect to ID and image groups of the frames following the seventeenth frame, the same processing is repeated by 16 frames each.

On the other hand, if the command readout from the command FIFO register 25 instructs a high-speed playback (e.g., a four-times normal speed playback), then as shown in FIGS. 8 and 9, under control of the CPU 26, first, the ID and the image groups of the first 16 frames (frames No. 1 to No. 16) of the corresponding data material are reproduced from the group W of the HDDs 21. Then, ID and image groups of the next 16 frames (frames No. 17 to No. 32) of the corresponding material data are reproduced from the group X of the HDDs 21 Further, ID and image groups of the next 16 frames (frames No. 33 to No. 48) of the corresponding material data are reproduced from the group Y of the HDDs 21. Furthermore, ID and image groups of the next 16 frames (frames No. 49 to No. 64) of the corresponding data material are reproduced from the group Z of the HDDs 21. At that time, no parity bit is reproduced from the HDD 22.

Figure 10:
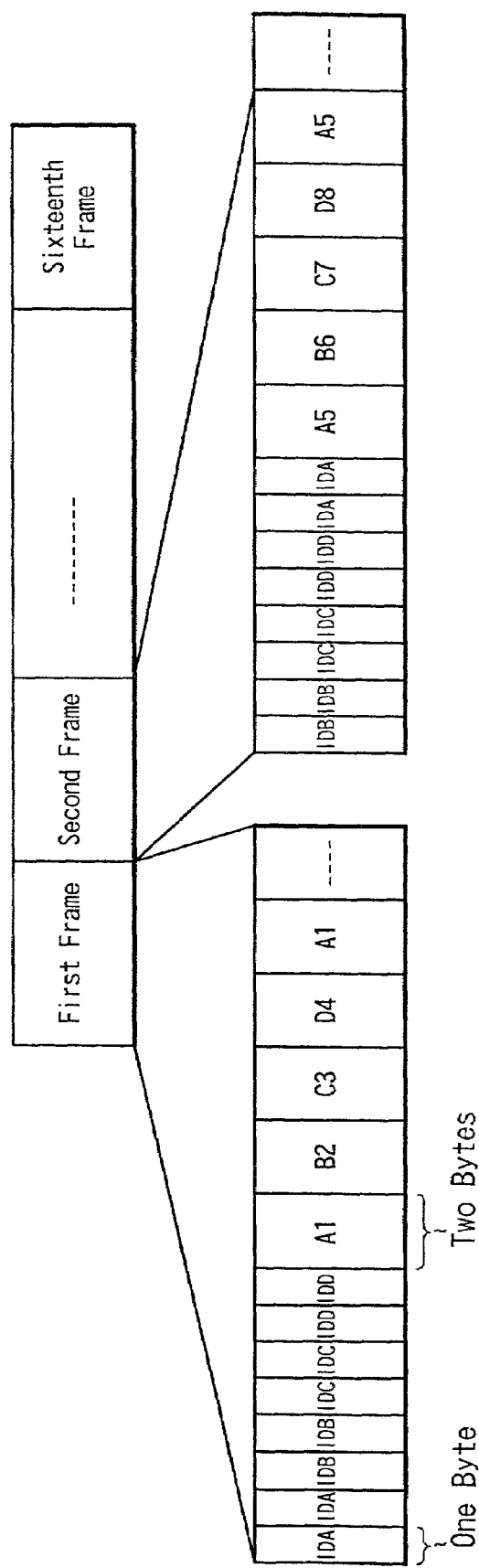
FIG. 10 is a diagram showing a structure of a data stream synthesized by a data multiplexer shown in FIG. 6 in the four-times normal speed playback mode.

Then, the ID and the image groups supplied from the HDDs 21 to the data multiplexer 27 are synthesized by the data multiplexer 27 so that there can be obtained a data stream shown in FIG. 10.

With respect to ID and image groups of the frames following the 65th frame, the same processing is repeated by 64 frames each.

The data stream synthesized by the data multiplexer 27 (synthesized and error-corrected data stream in the normal speed playback mode) is supplied to the reproducing data controller 29. The CPU 26 generates status data indicating the status for the command and the present situation of the disk array apparatus 2, and writes the status data thus generated in the status FIFO register 30. The reproducing data controller 29 generates a header and adds this header and the status data, read out from the status FIFO register 30, to the head of the data stream.

This data stream is transferred from the disk array apparatus 2 through the up-link bus 6 shown in FIG. 2 to the corresponding I/O port 1 within a time period permitted to the I/O port 1 of the command transmission source by the time slot signal.

The audio data reproduced from the audio data HDD (not shown) also is transferred to the corresponding I/O port 1 together with this data stream.

As shown in FIG. 3, the data stream transferred from the disk array apparatus 2 to the I/O port 1 is supplied to the HDD input interface 15. When detecting the header from the head of the data stream, the HDD input interface 15 supplies the status data following the header to the CPU 20 and writes the data stream following this status data in the buffer memory 16.

As shown in FIG. 3, when the data stream is accumulated in the buffer memory 16, the image group detecting circuit 17 detects the sequential orders of the image groups at the corresponding frame based on the ID added to the head of the image data of each frame in the data stream. Then, image data of each frame are written in the buffer memories 18(1), 18(2), 18(3) and 18(4) byte by byte in such a manner that the image data of the image groups A, B, C, D are distributed to the buffer memories 18(1), 18(2), 18(3) and 18(4), respectively. As a result, the image groups A, B, C, D are accumulated in the buffer memories 18(1), 18(2), 18(3) and 18(4), respectively When image groups of the data amount of four frames are respectively accumulated in the buffer memories 18(1), 18(2), 18(3) and 18(4), the video signal output interface 19 synthesizes image data of each frame by reading out the image groups from the buffer memories 18(1), 18(2), 18(3), 18(4) in the procedure opposite to the procedure in which the image group dividing circuit 12 distributes and writes the image groups in the buffer memories 13(1), 13(2), 13(3) and 13(4). Then, if this image data is the image data which has been compressed by the video signal input interface 11, then after such image data has been decoded (expanded), this image data and the audio data transferred from the disk array apparatus 2 are converted into a video signal of a predetermined standard and thereby outputted from the AV server.

Consequently, in the normal speed playback mode, since the image data of one frame are synthesized from the image groups A, B, C and D of the same frame, there is decoded the same image data as the recorded image data. On the other hand, in the four-times normal speed playback mode, since the image data of one frame are synthesized from the image groups A, B, C and D of the consecutive four frames, there are obtained image data which contain a portion of each of the image data of all recorded frames (one image group each).

As described above, in the AV server, upon normal speed playback mode, when digital errors exist in the image data reproduced from any one of the HDDs 21, such digital errors can be corrected by the parity bits. Accordingly, when the recorded material is on the air in which the recorded material data is reproduced in the normal speed playback mode and then transmitted, an image displayed on the television receiver can be prevented from being disturbed due to the digital errors.

On the other hand, in the four-times normal speed playback mode, since there are obtained the image data which contain one image group of each of image data of all recorded frames, image data of individual frames can be prevented from completely dropping out. Accordingly, when an edit-point is searched at high speed, if a momentary scene in which a flash bulb is lit is detected as an edit-point, then since a portion of the image data of the frame corresponding to such momentary scene is displayed on the monitor, such momentary scene can be detected. In the four-times normal speed playback mode, since digital errors are not corrected (as an assumption therefor, error-correcting codes for correcting digital errors of ID and image groups of each frame in the data stream shown in FIG. 10 synthesized in the four-times normal speed mode are not generated), the processing required by the AV server to search the edit-point at high speed can be simplified.

As described above, while the so-called G-Shuttle system is being used, the processing required in the high speed playback mode can be simplified and an image can be prevented from being disturbed due to digital errors in the normal speed playback mode.

In the above example, in the normal speed playback mode, digital errors of the ID and the image groups of each frame are corrected by the parity bits. However, as another example, the disk array apparatus 2 may include a Reed-Solomon code generating circuit, two HDDs for recording this Reed-Solomon code and an error-correcting circuit for correcting digital errors by this Reed-Solomon code such that, in the normal speed playback mode, the digital errors of the ID and the image groups of each frame may be corrected by the Reed-Solomon code. As a result, even when digital errors exist in the image groups reproduced from any two HDDs of the HDDs 21, such digital errors can be corrected.

The assignee of the present application has already proposed various modified examples of the so-called G-Shuttle system as the aforementioned Japanese patent application No. 11-317926, and hence such modified examples can be carried out in the present invention.

The present invention is not limited to the AV server having the arrangement shown in FIGS. 2, 3 and 6 and maybe applied to an AV server having a proper arrangement using an optical disk or other apparatus than the AV server in which image data can be recorded and/or reproduced by a memory means that can be accessed randomly.

As described above, while the so-called G-Shuttle system is being used, the processing required in the high speed playback mode can be simplified and an image can be prevented from being disturbed due to a digital error in the normal speed playback mode.

Accordingly, if the present invention is applied to the AV server, for example, the processing required by the AV server to search the edit-point at high speed can be simplified. Simultaneously, when the recorded material data is on the air in which the recorded material data is reproduced in the normal speed playback mode and then transmitted, it becomes possible to prevent an image displayed on the television receiver from being disturbed due to a digital error.

Having described a preferred embodiment of the invention with reference to the accompanying drawings, it is to be understood that the invention is not limited to that precise embodiment and that various changes and modifications could be effected therein by one skilled in the art without departing from the spirit or scope of the invention as defined in the appended claims.

What is claimed is:

1. An image recording and reproducing apparatus comprising:
    dividing means for dividing inputted image data to provide a plurality of image groups at every predetermined image unit;
    first memory means grouped into groups in response to the number of said image groups and which can be accessed randomly;
    second memory means;
    generating means for generating an error-correcting code;
    correcting means for correcting digital errors by said error-correcting code; and
    recording control means for controlling said first memory means such that said first memory means record said image groups, controlling said generating means such that said generating means generates error-correcting codes of said image groups at every said image unit and controlling said second memory means such that said second memory means stores said error-correcting codes while cyclically changing a corresponding relationship between said image groups and said first memory means at every said image unit,
    wherein during a normal playback, each group of the first memory means reproduces the image groups, and
    wherein during a high-speed playback, the groups of the first memory means reproduce the image groups successively.

2. Art image recording and reproducing apparatus according to claim 1, further comprising reproducing control means for controlling said groups of said first memory means and said second memory means such that said groups of said first memory means and said second memory means reproduce said image groups and said error-correcting codes over the range of said unit of identical images and controlling said error-correcting means such that said correcting means corrects digital errors of said image groups by said error-correcting codes in the once normal speed playback mode.

3. An image recording and reproducing apparatus according to claim 2, wherein said reproducing control means further controls said groups of said first memory means such that said groups of said first memory means reproduce said image groups over the range of said unit of images which are not identical to each other in the playback mode at speed higher than a once normal speed.

4. An image recording and reproducing apparatus according to claim 3, further comprising synthesizing means for synthesizing one image data of said image unit from said image groups of said unit of identical images reproduced and error-corrected by said reproducing control means in the once normal speed playback mode.

5. An image recording and reproducing apparatus according to claim 4, wherein said synthesizing means further synthesizes one image data of said image unit from said image groups of said units of images which are not identical to each other reproduced by said reproducing control means in the playback mode at speed higher than a once normal speed.

6. An image recording and reproducing apparatus comprising:
    dividing means for dividing inputted image data to provide a plurality of image groups at every predetermined image unit;
    first memory means grouped into groups in response to the number of said image groups and which can be accessed randomly;
    second memory means; generating means for generating an error-correcting code;
    correcting means for correcting digital errors by said error-correcting code;
    recording control means for controlling said first memory means such that said first memory means records said image groups, controlling said generating means such that said generating means generates error-correcting codes of said image groups at every said image unit and controlling said second memory means such that said second memory means stores said error-correcting codes while cyclically changing a corresponding relationship between said image groups and said first memory means at every said image unit;
    reproducing control means for controlling said groups of said first memory means and said second memory means such that said groups of said first memory means and said second memory means reproduce said image groups and said error-correcting codes over the range of said unit of images which are identical to each other and controlling said correcting means such tat said correcting means corrects digital errors of said image groups by said error-correcting codes in the once normal speed playback mode and further controlling said groups of said first memory means such that said groups of said first memory means reproduce said image groups over the range of said unit of images which arc identical to each other in the playback mode at speed higher than the once normal speed; and synthesizing means for synthesizing one image data of said image unit from said image groups of said unit of identical images reproduced and error-corrected by said reproducing control means in the once normal speed playback mode and further synthesizing one image data of said image unit from said image groups of said unit of images which are not identical to each other reproduced by said reproducing control means;

wherein during a normal playback, each group of the first memory means reproduces the image groups, and wherein during a high-speed playback, the groups of the first memory means reproduce the image groups successively.

7. An image recording and reproducing apparatus according to claim 6, wherein said first memory means or said second memory means is a hard disk or en optical disk.

8. An image recording and reproducing apparatus according to claim 6, wherein said error-correcting code is a parity code.

9. An image recording and reproducing apparatus according to claim 6, wherein said image recording and reproducing apparatus is a video and/or audio server or a video server.

10. An image recording and reproducing method comprising the steps of:

a first step of dividing inputted image data to provide a plurality of image groups at every predetermined image unit;

a second step of recording said image groups by first memory means grouped into groups in response to the number of said image groups and which can be accessed randomly while a corresponding relationship between said image groups and the groups of said first memory means is being cyclically changed at every said image unit; and a third step of generating error-correcting codes of said image groups at every said image unit and storing said error-correcting codes by second memory means, wherein during a normal playback, each group of the first memory means reproduces the image groups, and wherein during a high-speed playback, the groups of the first memory means reproduce the image groups successively.

11. An image recording and reproducing method according to claim 10, further comprising a fourth step in which said image groups and said error-correcting codes are reproduced from said groups of said first memory means and said second memory means over the range of said unit of images which are identical to each other and in which said image groups are error-corrected by said error-correcting codes in the once normal speed playback mode.

12. An image recording and reproducing method according to claim 11, further comprising a fifth step in which said image groups are reproduced from the groups of said first memory means over the range of said unit of images which are not identical to each other in the playback mode at speed higher than the once normal speed.

13. An image recording and reproducing method according to claim 12, further comprising a sixth step in which one image data of said image unit is synthesized from said image groups of said unit of identical images reproduced and error-corrected at said fourth step in the once normal speed playback mode.

14. An image recording and reproducing method according to claim 13, further comprising a seventh step in which one image data of said image unit is synthesized from said image groups of said unit of images which are not identical to each other reproduced at said fifth step in the playback mode at speed higher than the once normal speed.

* * * * *